United States Patent [19]
Schoen

[11] Patent Number: 4,472,630
[45] Date of Patent: Sep. 18, 1984

[54] DUAL MODE PARTICLE DETECTION APPARATUS FOR A SPECTROSCOPY SYSTEM

[75] Inventor: Alan E. Schoen, Phoenix, Ariz.

[73] Assignee: Purdue Research Foundation, West Lafayette, Ind.

[21] Appl. No.: 357,761

[22] Filed: Mar. 12, 1982

[51] Int. Cl.[3] .............................................. B01D 59/44
[52] U.S. Cl. ..................................... 250/281; 250/300
[58] Field of Search ........................ 250/281, 300, 299; 328/243; 313/103 CM, 105 CM

[56] References Cited

U.S. PATENT DOCUMENTS 4,267,442 5/1981 Rosier .......................... 313/103 CM
4,314,156 2/1982 Kuppermann et al. ............. 250/281

*Primary Examiner*—Alfred E. Smith
*Assistant Examiner*—T. N. Grigsby
*Attorney, Agent, or Firm*—O'Rourke & Harris

[57] ABSTRACT

Dual mode particle detection apparatus is disclosed for a spectroscopy system. An ion detection unit for a mass spectrometer data acquisition system is shown to include a dual channel channeltron providing an analog signal output that is coupled to a current-to-frequency converter for forming a digital TTL pulse train, and a pulse output which is applied to a pulse counting amplifier/discriminator. The resulting digital signals from the current to frequency converter and the amplifier/-discriminator are multiplexed to a pulse counter which interfaces with the central computer of the system.

17 Claims, 9 Drawing Figures

DUAL MODE PARTICLE DETECTION APPARATUS FOR A SPECTROSCOPY SYSTEM

FIELD OF THE INVENTION

This invention relates to a particle detection apparatus and, more particularly, relates to a dual mode particle detection apparatus for a spectroscopy system.

BACKGROUND OF THE INVENTION

Particle detection through use of spectroscopy apparatus is well known, and, in particular, it is known that data acquisition systems have heretofore utilized mass spectrometer units. Such apparatus and systems, however, have not been found to be completely satisfactory, due at least in part to the detection unit utilized, and hence improvement of such apparatus and/or systems by providing improved detection units would be useful.

In addition, while a dual channel channeltron has also been heretofore suggested, such a device has not been heretofore incorporated into spectroscopy apparatus.

SUMMARY OF THE INVENTION

This invention provides an improved particle detection apparatus for a spectroscopy system. The detection apparatus includes a dual channel channeltron and associated processing circuitry which improves system performance, particularly in providing effective wide dynamic range signal detection, with automation of detection mode switching in an effecient manner resulting in improved data precision as well as improving dynamic range.

It is therefore an object of this invention to provide an improved particle detection apparatus for a spectroscopy system.

It is another object of this invention to provide an improved detection apparatus for a spectroscopy system that includes a dual mode particle detector and associated processing circuitry.

It is still another object of this invention to provide an improved dual mode particle detection system for a mass spectrometer data acquisition system.

It is still another object of this invention to provide an improved spectroscopy system having dual mode detection.

It is yet another object of this invention to provide an improved mass spectrometer data acquisition system having dual mode detection.

It is still another object of this invention to provide an improved detection unit having wide dynamic range signal detection.

It is yet another object of this invention to provide an improved detection unit with automated dual mode switching to improve data precision and dynamic range.

With these and other objects in view, which will become apparent to one skilled in the art as the description proceeds, this invention resides in the novel construction, combination, and arrangement of parts substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and which.

DESCRIPTION OF THE INVENTION

Figure 1:
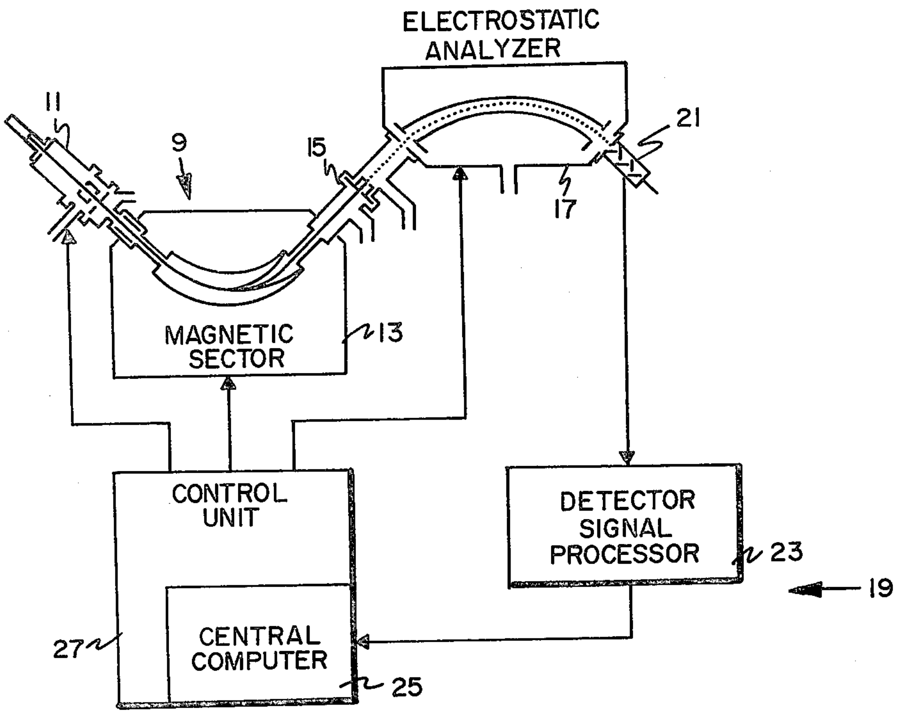
FIG. 1 is a block and partial schematic diagram of a mass spectrometer having the detection unit of this invention shown utilized in conjunction therewith.

As shown in FIG. 1, mass spectrometer 9 includes, as is conventional, an ion source 11, a magnetic sector 13, a collision region 15, and an electrostatic analyzer 17. Detection system or unit 19, which includes detector 21 and detector signal processor 23, is also provided with the output of processor 23 being coupled to central computer 25 (which may be, for example, a Hewlett Packard HP2100A computer) of control unit 27, it being understood that the control unit controls operation of mass spectrometer 9 as is well known in the art.

Detection unit 19 improves the mass spectrometer data acquisition system and enables the system to exceed the capabilities of known commercial mass spectrometer data acquisition systems or schemes. While acquisition speed falls short of ideal expectations since the system, as shown, is based on computer rather than hardware control, the characteristics of dynamic range, bandwidth selectability, acquisition precision, selection between multiplier output current monitoring (which can exhibit both mass and kinetic energy nonlinearity), and pulse counting (which has a limited maximum count rate), are completely computer selectable.

All trade offs generally associated with detection system design are dynamically alterable so the acquisition scheme optimizes detection characteristics to fit the application. This is accomplished through use of a dual channeltron which, while known for other applications, has not been heretofore utilized with spectroscopy systems, and the dual channeltron has proved to be well suited for mass spectrometer/mass spectrometer (MS/MS) systems.

Figure 2:
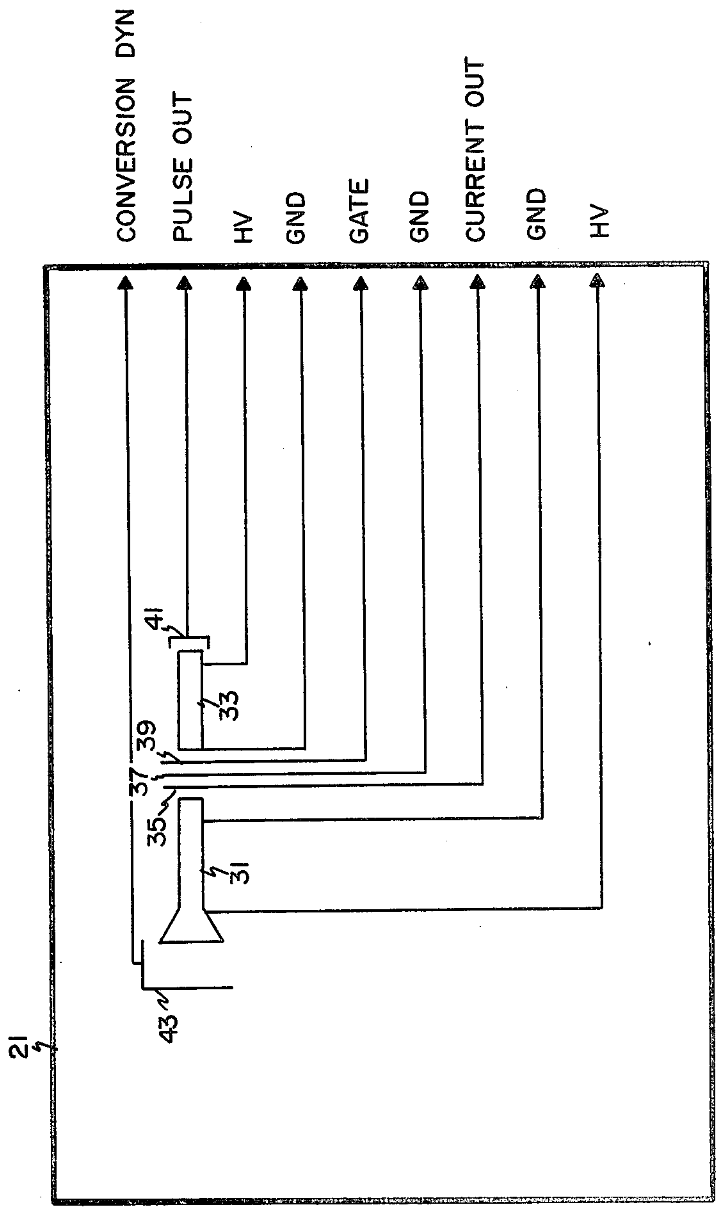
FIG. 2 is a partial schematic presentation of a dual channel channeltron illustrating the outputs thereof.

As indicated in FIG. 2, dual channeltron detector 21, which may be a dual mode channeltron made by Galileo Optoelectronics, Sturbridge, Mass., has two consecutive channeltrons 31 and 33 which are separated by a ceramic wafer assembly which contains three grids 35, 37 and 39. The first channel multiplier is biased negative at the entrance, with the exit referenced to ground. The first grid 35 follows this and collects about 90% of the emitted electrons for analog current detection. The second grid 37 is at ground potential to serve as an electrostatic shield for the analog collection grid 35. The third grid 39 is a gate which, when biased at approximately 300 volts, suppresses most of the current which would otherwise enter the second channeltron.

The second channeltron 33 collects electrons which pass through the grid assembly when the gate grid is grounded and further multiplies the current. This section is preferably operated at high gains for pulse counting applications. The entrance of the high gain channel is referenced to ground and the exit is at a high positive potential which necessitates capacitive coupling at collector 41 of the pulse counting output. The entrance 43 of the assembly is a conversion dynode which is biased to allow the detector to be used with either positive or negative ions. Also, a high conversion dynode bias serves to minimize kinetic energy effects on detector response.

The low current levels encountered in MS/MS spectra are ideally suited to pulse counting for two reasons. First, pulse counting allows adjustment of the discriminator level to reject electronic noise which may be significant at low ion flux. Second, the MS/MS spectrum is obtained by scanning the kinetic energy from seven kilovolts to less than one kilovolt. The linearity of the multiplier's response will not cover this range, even with a conversion dynode. For mass spectra and measurement of the main beam in MS/MS spectra, analog detection is necessary. Most mass spectra are taken at one kinetic energy, so exclusive of a mass effect, linearity is reasonable. More importantly, the high signal levels encountered in mass spectra are sufficient to exceed the 1 microamp output current maximum of a channeltron operating at high gain for pulse counting.

Figure 3A:
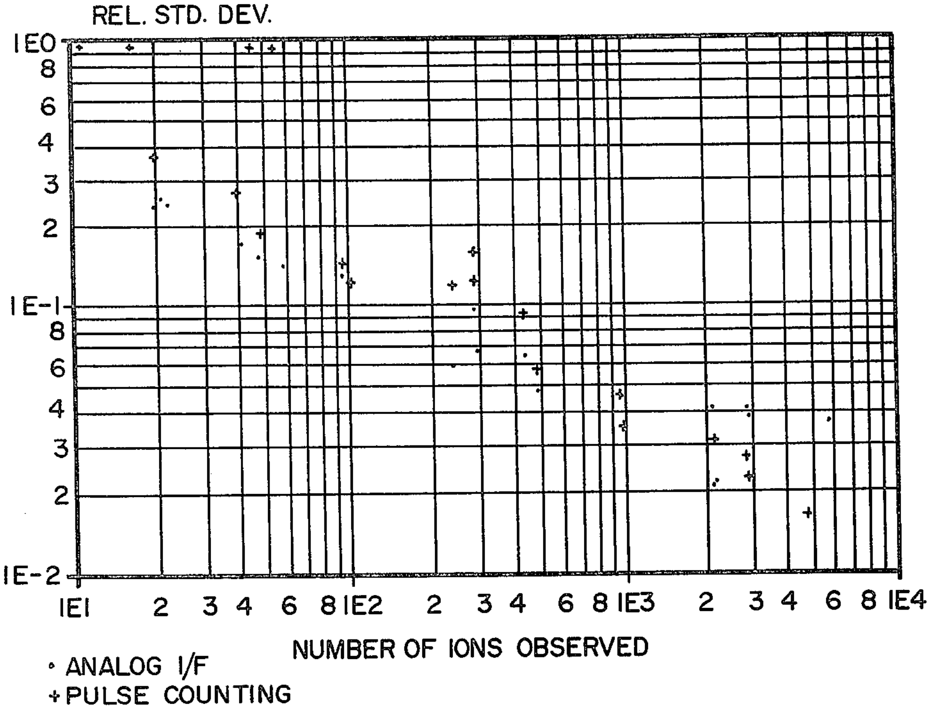
FIG. 3A is an illustration of the precision of data acquisition for both the analog and pulse counting sections of the dual mode detector of this invention.
Figure 3B:
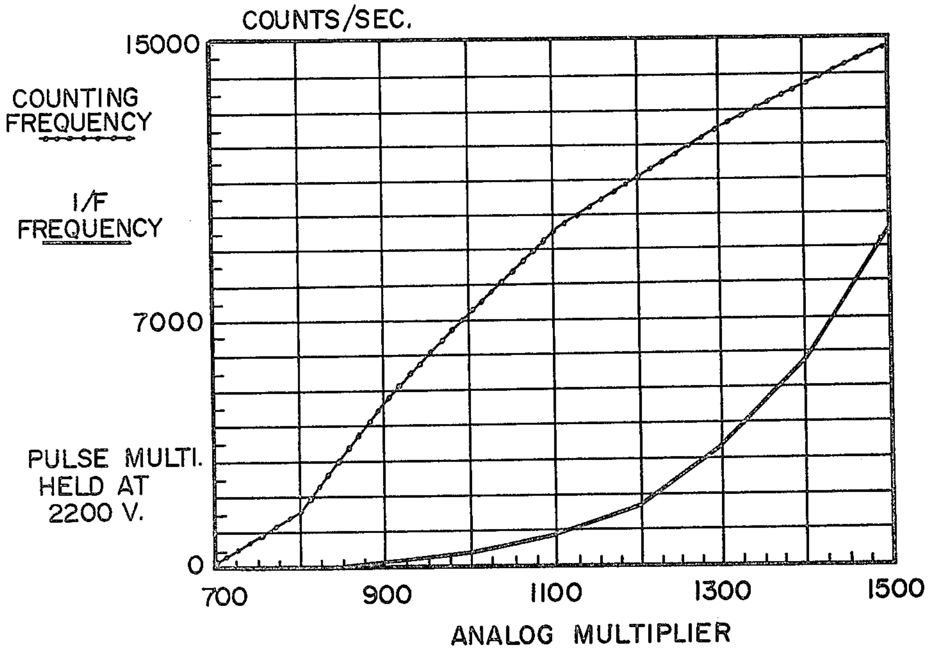
FIG. 3B is a graphical presentation illustrating pulse to analog comparison for the dual mode detector.

A comparison of the precision of data acquisition using the analog and pulse counting sections of dual mode detector is shown in FIG. 3A where the + indicates analog data and the · is for pulse data. FIG. 3B shows the effection of analog multiplier voltage on both the analog and pulse section signals (the pulse counting section is held at a constant voltage).

Figure 4A:
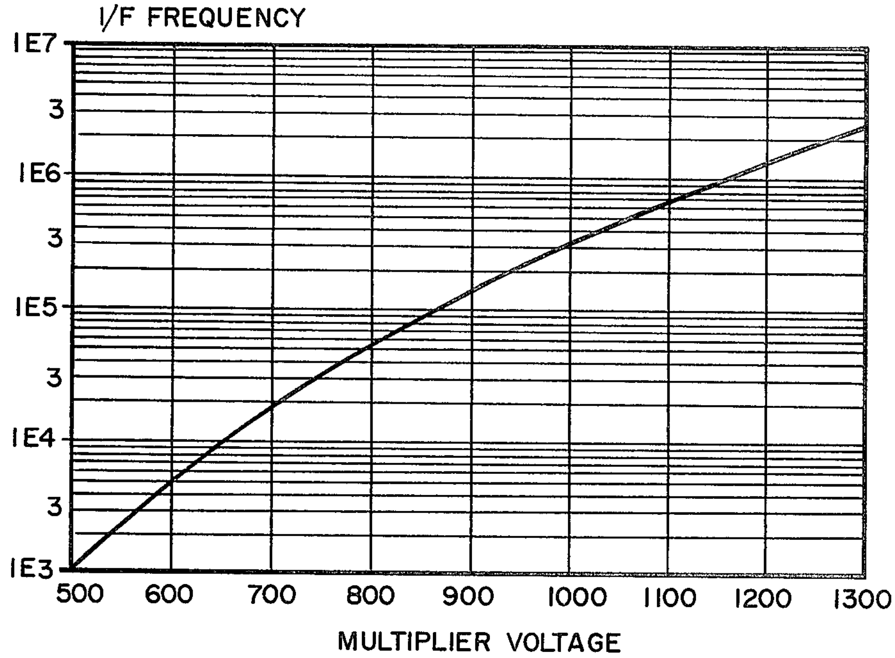
FIG. 4A shows a gain curve for the analog section of the dual mode channeltron.
Figure 4B:
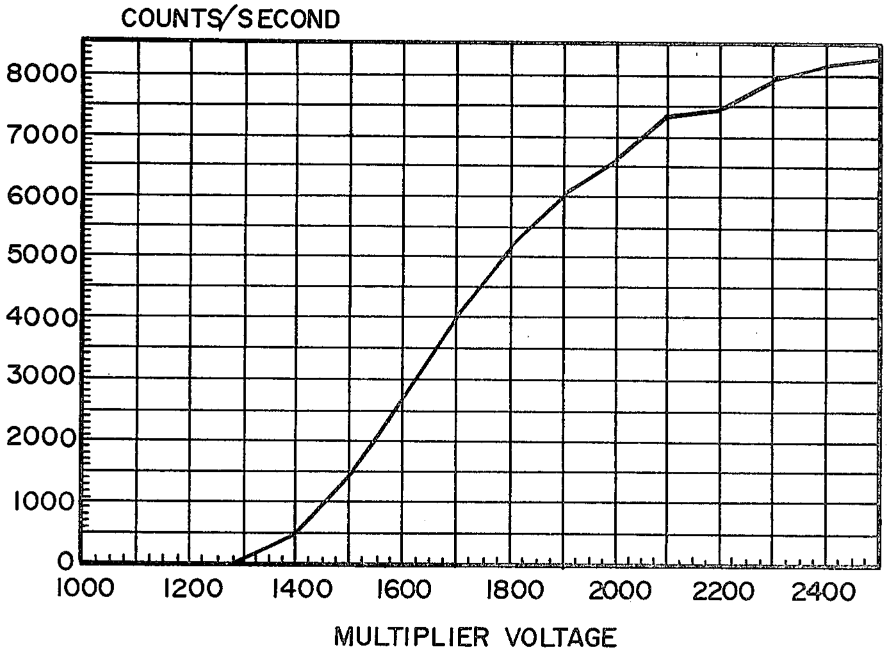
FIG. 4B shows the gain curve for the pulse section of the dual mode channeltron.

A comparison of the gain curves for the two sections of the dual mode channeltron 21, with both exhibiting normal behavior, is shown in FIG. 4 with FIG. 4A showing the gain curve of the analog section and FIG. 4B showing the gain curve of the pulse section.

Figure 5:
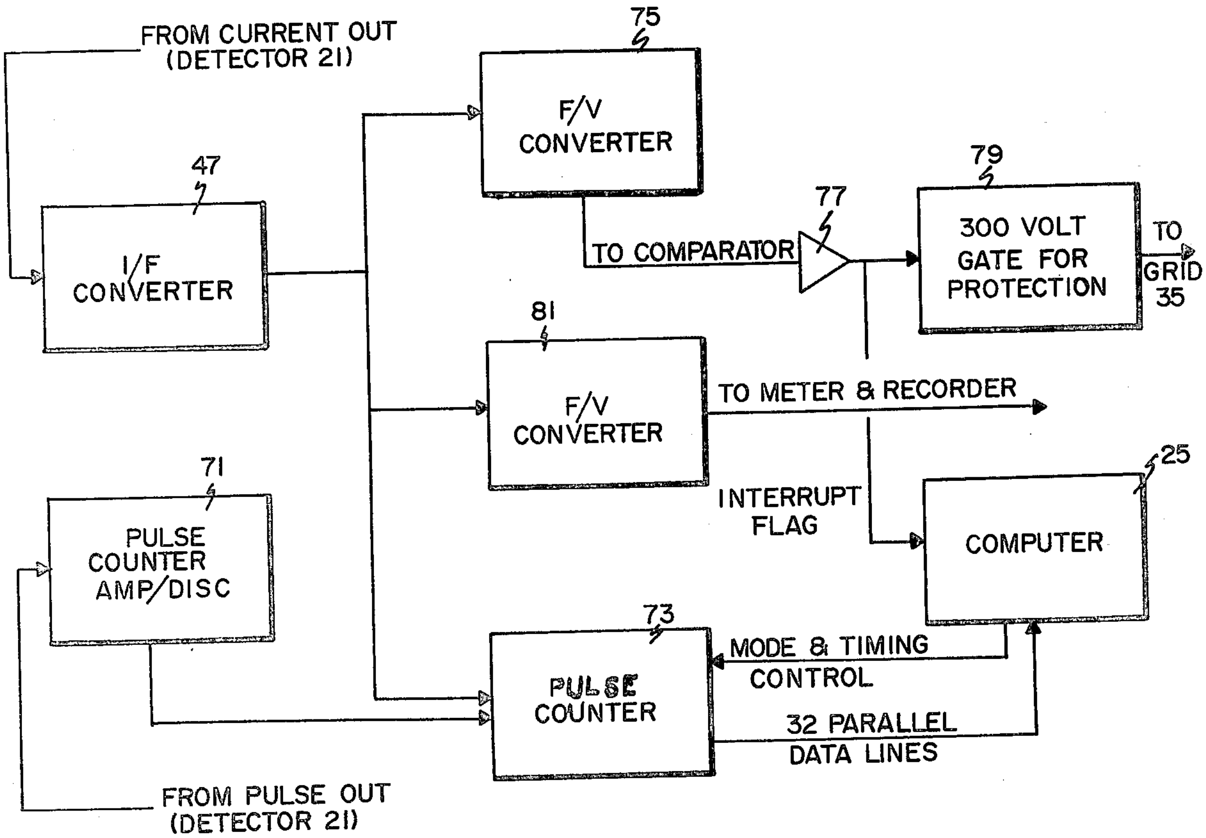
FIG. 5 is a block diagram illustrating the detector processing portion of the detection system or unit of this invention.

Conversion of the analog signal to a pulse train is shown in FIG. 5 to be effected by coupling the analog current output signal from detector 21 to current-to-frequency (C/F) converter 47. Converter 47 may be an Analog Technology Corp. 170 current-to-frequency converter to supply a digital TTL pulse train output.

Use of C/F converter 47 has many inherent advantages, both fundamental and practical. On the fundamental side, the trade off between speed and signal to noise is easily dealt with once the signal is a pulse train. For example, tests with the low gain channel showed that 57+ from isobutane can easily produce $10^9$ ions per second which at a gain of 500 will produce a current of $5\times10^{-8}$ amps which will give an output frequency of 5 megahertz on the $10^{-14}$ amps/hertz range. This is the maximum output frequency of the converter although there are two less sensitive scales of $10^{-13}$ and $10^{-12}$ amps/hertz. Clearly for such a high ion arrival rate, very fast sampling intervals may be employed.

Statistical evaluation of the device has shown that the precision of any measurement made with this system approaches ion counting statistics very closely. The limit to the precision of the measurement is a function of the number of ions observed within the sampling interval. As long as the relative accuracy of the current measurement, which is $\pm1$ pulse, does not greatly exceed the relative standard deviation of the ion arrival rate, which is the square root of the number of ions, the analog detection system will be as precise as theoretically possible.

To illustrate this, the standard deviation of the isobutane signal is $\pm1000$ or a relative standard deviation of 1 ppm if a sampling interval of 1 second is used. The 5 MHz signal is accurate to $\pm1$ pulse so the accuracy of the measurement is 0.2 ppm. If a sampling time of 10 μsec is used instead, the number of ions observed is 10,000 which results in a measurement precision of one part per hundred The frequency will still be 5 MHz, but only 50 pulses will be counted with an accuracy of $\pm1$, so the digitization in this case will be only half the precision imposed by counting statistics.

To properly use the detection system, the sampling interval must be tailored to the signal level to prevent the conversion accuracy from limiting the quality of the data acquired. Since the counting aperture is normally remotely programmed, the control of the integration time can be used to balance the considerations of acquisition speed and spectral quality which can be affected by other system variables such as beam stability and sample fluctuation.

Another use of this is evident when the system is applied to desorption. The signal from a 10 Hz laser repetition rate exists for only a millisecond after each laser pulse. An analog detector which integrates the signal for the entire one hundred millisecond interval between pulses will monitor noise for 100% of the time and signal for only 1% of the time. That is an inherent signal to noise loss of a factor of 100. By using that type of system, it would be necessary to monitor 10,000 laser pulses to compensate for the loss of signal to noise from just one sample. This, of course, does not account for irreproducibility in the desorption process which would require multiple pulse monitoring anyway.

Figure 6:
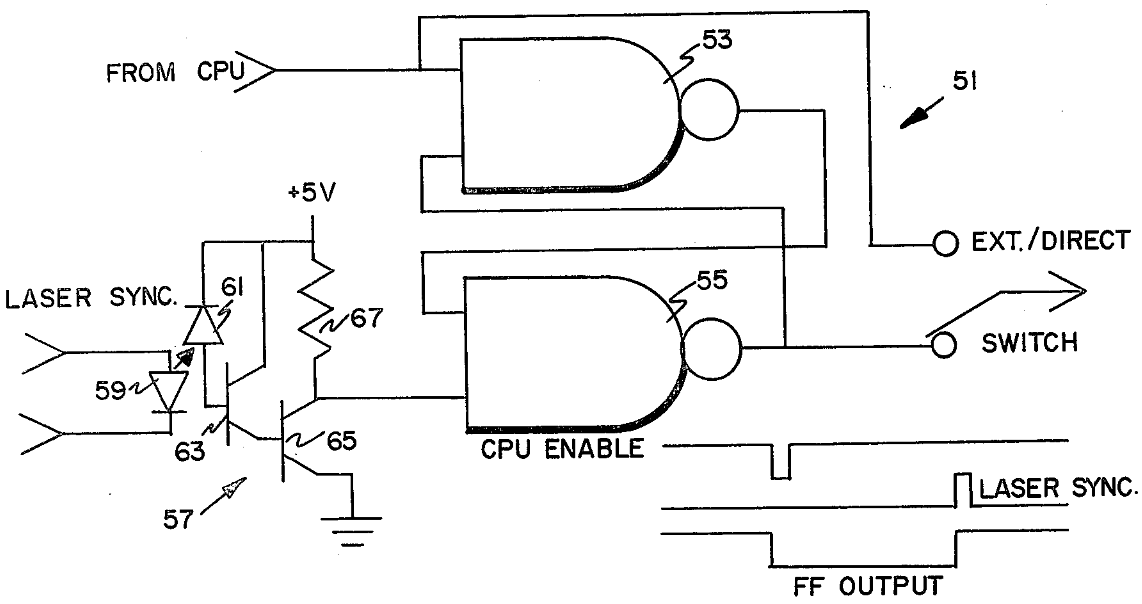
FIG. 6 is an electrical schematic diagram of apparatus useful for counter/laser synchronization.

The detection system of this invention, on the other hand, overcomes this problem by allowing the counter to synchronize its counting aperture with the laser pulse. As indicated in FIG. 6, a simple flip flop 51 (comprised of NAND gates 53 and 55) can be used which resets the counter when the computer output triggers a reading and holds the reset state until the laser fires (through laser sync network 57 composed of diodes 59 and 61, transistor 63 and 65, and resistor 67) which causes the flip flop to release its hold, thereby initiating the counting cycle. The use of two NAND gates allows full synchronization of the data acquisition channel to the external laser repetition rate. The simple circuitry as shown in FIG. 6, requires, however, that the computer be faster than the external device since a computer command pulse during an external sync pulse will be ignored.

As shown in FIG. 5, the pulse output from detector 21 is coupled to pulse counting amplifier/discriminator 71, the output of which is coupled to pulse counter 73 (which also receives the output from I/F converter 47). Pulse counting amplifier/discriminator 71 is preferably a Princeton Applied Research (PAR) 1121A, while pulse counter 73 is preferably a Princeton Applied Research (PAR) 1109.

Practical considerations relate to programming and interfacing the detection system for automatic control. The photon counter preferably has a jumper selectable option to allow either an input from pulse counting amplifier/discriminator 71 or an external TTL logic pulse train. By adding a 74157 data selector chip to the pulse steering board in the counter, this jumper may be externally controlled by a computer. Local control of the multiplexer can be achieved by a remotely positioned (i.e., at the front panel) push button. This allows identical programming from both the analog and pulse counting detection schemes.

The grid prior to the pulse counting channel must be at ground to enable electrons to enter the pulse section. When enabled, however, a large ion beam could possibly destroy the pulse counting section of the multiplier assembly. To prevent this, the analog output is constantly monitored by frequency-to-voltage (F/V) converter 75 (the input frequency of which is preferably corrected by a digital frequency divider which is programmed by the current-to-frequency range selection logic so the pulse train is representative of the signal which is present at the second channeltron).

If the signal goes too high, grid 35 is energized to 300 volts (by an output from F/V converter 75 coupled to grid 35 through amplifier 77 and 300 volt gate 79) to suppress the response of the pulse section. This condition is also sent to central computer 25 as an interrupt flag to set the flag to the computer which triggers an interrupt. This also causes the control bit to clear which automatically selects the analog data channel. The interrupt is tied to a service routine which can then take appropriate steps to modify the acquisition sequence for the mode switch.

The output from I/F converter 47 is also coupled to frequency to voltage converter 81 which supplies an output signal for metering and recording purposes.

Data from the counter to the computer is in BCD format which requires 32 lines for parallel transmission of the eight digits. A custom 32 bit input port was constructed which is compatable with the TTL logic levels of the PAR interface. Software to support this hardware includes two drivers (DVR74 and DVR75) and a format conversion routine (BCD). The 32 bit input port is also compatable with the parallel output of an ORTEC counter.

Figure 7:
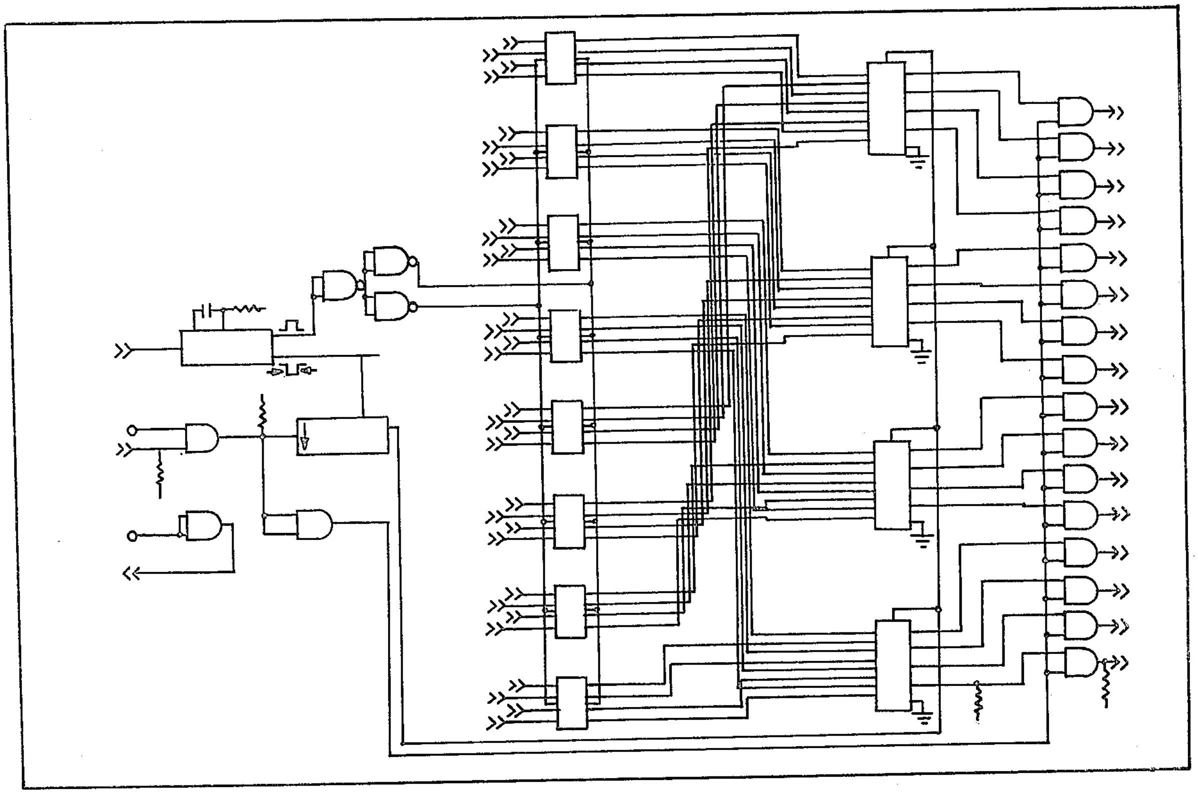
FIG. 7 is a schematic diagram for a 32 bit input port useful for interfacing between the photon counter and computer.

A schematic diagram for the 32 bit input port is shown in FIG. 7. This port is similar to the HP data source interface, but uses TTL logic for the input, and is not compatible with direct memory access.

The detection unit thus described, when utilized with a spectroscopy system, as described, thus provides an improved system with wide dynamic range signal detection and yet also achieves low noise levels.

As can be appreciated from the foregoing, this invention thus provides an improved detection unit for a spectroscopy system.

I claim:

1. Detection apparatus for a spectroscopy system, said detection apparatus comprising:

dual mode detecting means positioned with respect to said spectroscopy system to detect predetermined indications developed during operation of said system, said detecting means being a dual channel channeltron providing separate output signals related to said predetermined indication with a first output signal of said separate output signals being in current form and a second output signal of said separate output signals being in pulse form; and signal processing means connected with said dual mode detecting means for receiving said separate output signals therefrom and responsive thereto providing an output signal indicative of said detected predetermined indications, said signal processing means including a first channel for processing the output signal in current form and including a current-to-frequency converter for converting said current to a pulse train, and a second channel for processing the output signal in pulse form.

2. The detection apparatus of claim 1 wherein said spectroscopy system includes a mass spectrometer for analysis of mixtures, and wherein said dual mode detecting means detects spectra developed by said mass spectrometer and provides said separate output signals indicative thereof.

3. The detection apparatus of claim 1 wherein said signal processing means includes counter means, and wherein said pulse outputs from said current-to-frequency converter in said first channel and said pulses on said second channel are coupled to said counter means.

4. The detection apparatus of claim 3 wherein said spectroscopy system includes computer means, and wherein said counter means is connected with said computer means.

5. Detection apparatus for a mass spectrometer data acquisition system utilizable for mixture analysis, said detection apparatus comprising:

dual mode detecting means positioned with respect to said mass spectrometer system whereby spectra developed by said system relating to a mixture then being analyzed is sensed by said detecting means, said detecting means being a dual channel channeltron providing an analog current output signal and a pulse output signal both of which are related to said sensed spectra;

first channel means for receiving said analog current output signal from said detecting means, said first channel means including a current-to-frequency converter for converting said analog current to pulses;

second channel means for receiving said pulse output from said detecting means and processing the same to provide a pulse output signal; and counter means connected to receive said pulse output from said first and second channel means for counting of said pulses and providing outputs indicative of said sensed spectra.

6. The detection apparatus of claim 5 wherein said mass spectrometer data acquisition system includes computer means, and wherein said counter means is interfaced with said computer means.

7. The detection apparatus of claim 6 wherein the output of said counter means is connected with said computer means through connecting means having 32 parallel data lines.

8. The detection apparatus of claim 5 wherein said apparatus includes means for synchronizing operation of said counter means with a laser pulse when utilized in conjunction with said mass spectrometer system.

9. The detection apparatus of claim 8 wherein said synchronizing means includes a flip-flop connected to receive said laser pulse and responsive thereto controlling operation of said counting means.

10. The detection apparatus of claim 9 wherein said flip-flop includes a pair of NAND gates, and wherein said laser pulse is coupled to one of said flip-flops through laser sync circuit means.

11. The detection apparatus of claim 5 wherein said apparatus includes a frequency-to-voltage converter connected with said current-to-frequency converter and gate means connected with said dual mode detecting means for providing a protective voltage to said dual mode detecting means when said current signal exceeds a predetermined value.

12. The detection apparatus of claim 11 wherein said protective voltage is about 300 volts.

13. The detection apparatus of claim 11 wherein said dual mode detecting means is a dual channel channeltron having a protective grid, and wherein said gate means is connected with said protective grid for coupling said protective voltage thereto.

14. The detection apparatus of claim 11 wherein said apparatus includes a second frequency-to-voltage converter connected with said current-to-frequency converter to supply a voltage output signal for metering and recording purposes.

15. A mass spectrometer data acquisition system, comprising:

mixture analysis means for receiving a mixture to be analyzed and developing spectra indicative of predetermined portions of said mixture;

dual mode detecting means positioned with respect to said mixture analysis means whereby spectra developed by said mixture analysis means is sensed by said detecting means, said detecting means being a dual channel channeltron providing an analog current output signal and a pulse output signal both of which are related to said sensed spectra;

first channel means for receiving said analog current output signal from said detecting means, said first channel means including a current-to-frequency converter for converting said analog current to pulses;

second channel means for receiving said pulse output from said detecting means and processing the same to provide a pulse output signal; and counter means connected to receive said pulse outputs from said first and second channel means for counting of said pulses and providing outputs indicative of said sensed spectra.

16. The system of claim 15 wherein said system includes computer means, and wherein said counter means is interfaced with said computer means.

17. The system of claim 16 wherein the output of said counter means is connected with said computer means through connecting means having 32 parallel data lines.

* * * * *